United States Patent
Jin

(10) Patent No.: US 10,422,996 B2
(45) Date of Patent: Sep. 24, 2019

(54) ELECTRONIC DEVICE AND METHOD FOR CONTROLLING SAME

(71) Applicant: SAMSUNG ELECTRONICS CO., LTD., Suwon-si (KR)

(72) Inventor: Kyoung-shin Jin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/741,088

(22) PCT Filed: Oct. 13, 2016

(86) PCT No.: PCT/KR2016/011510
§ 371 (c)(1),
(2) Date: Dec. 29, 2017

(87) PCT Pub. No.: WO2017/065535
PCT Pub. Date: Apr. 20, 2017

(65) Prior Publication Data
US 2018/0196266 A1    Jul. 12, 2018

(30) Foreign Application Priority Data
Oct. 14, 2015   (KR) .................. 10-2015-0143569

(51) Int. Cl.
*G02B 27/01*        (2006.01)
*H04W 4/02*         (2018.01)
(Continued)

(52) U.S. Cl.
CPC .......... *G02B 27/0172* (2013.01); *G06F 3/011* (2013.01); *G06T 15/20* (2013.01); *H04W 4/02* (2013.01); *G02B 2027/0123* (2013.01)

(58) Field of Classification Search
CPC .. G02B 27/01; G02B 27/017; G02B 27/0101; G02B 27/0093; G02B 27/0138;
(Continued)

(56) References Cited

U.S. PATENT DOCUMENTS

| 5,774,262 A | 6/1998 | Schwerdtner et al. |
| 5,989,157 A | 11/1999 | Walton |

(Continued)

FOREIGN PATENT DOCUMENTS

| CN | 1838778 A | 9/2006 |
| CN | 1934584 A | 3/2007 |

(Continued)

OTHER PUBLICATIONS

Communication dated Jul. 31, 2018, issued by the European Patent Office in counterpart European Application No. 16855752.8.
(Continued)

*Primary Examiner* — Sultan Chowdhury
(74) *Attorney, Agent, or Firm* — Sughrue Mion, PLLC

(57) ABSTRACT

Disclosed is an electronic device. The electronic device comprises: a display for displaying virtual reality (VR) content; a detection unit for detecting a distance between the electronic device and at least one from among a user and a terminal device held by the user; and a processor for determining a virtual field of view corresponding to the distance detected by the detection unit, and controlling the display to display a screen including a VR content area corresponding to the virtual field of view.

13 Claims, 11 Drawing Sheets

(51) Int. Cl.
*G06F 3/01* (2006.01)
*G06T 15/20* (2011.01)

(58) Field of Classification Search
CPC ..... G02B 27/0172; G06F 3/011; G06F 3/012; G06F 3/013; G06F 3/0346; G06F 3/04815
See application file for complete search history.

(56) References Cited

U.S. PATENT DOCUMENTS

| | | | |
|---|---|---|---|
| 5,993,319 A | 11/1999 | Aoyama | |
| 6,084,979 A | 7/2000 | Kanade et al. | |
| 6,317,127 B1 | 11/2001 | Daily et al. | |
| 6,400,364 B1 | 6/2002 | Akisada et al. | |
| 6,999,239 B1 | 2/2006 | Martins et al. | |
| 7,091,926 B2 | 8/2006 | Kulas | |
| 7,212,208 B2 | 5/2007 | Khozai | |
| 7,305,691 B2 | 12/2007 | Cristofalo | |
| 7,535,486 B2 | 5/2009 | Motomura et al. | |
| 7,623,089 B2 | 11/2009 | Sato | |
| 7,682,021 B2 | 3/2010 | Sabel | |
| 8,123,618 B2 | 2/2012 | Karmarkar | |
| 8,253,778 B2 | 8/2012 | Atsushi | |
| 8,368,647 B2 | 2/2013 | Lin | |
| 8,390,535 B2 | 3/2013 | Sato | |
| 8,414,130 B2 | 4/2013 | Pelah | |
| 8,441,435 B2 | 5/2013 | Kondo et al. | |
| 8,610,771 B2 | 12/2013 | Leung et al. | |
| 8,646,910 B1 | 2/2014 | Schenkein | |
| 8,786,675 B2 | 7/2014 | Deering | |
| 8,831,780 B2 | 9/2014 | Zelivinski et al. | |
| 9,041,623 B2 | 5/2015 | Liu et al. | |
| 9,398,290 B2 | 7/2016 | Hasegawa et al. | |
| 9,451,242 B2 | 9/2016 | Wu et al. | |
| 2004/0066547 A1* | 4/2004 | Parker | G02B 5/32 359/15 |
| 2006/0215261 A1 | 9/2006 | Sato | |
| 2007/0019000 A1 | 1/2007 | Motomura et al. | |
| 2009/0271732 A1 | 10/2009 | Kondo et al. | |
| 2010/0020162 A1 | 1/2010 | Sato | |
| 2010/0053164 A1* | 3/2010 | Imai | G06F 3/011 345/427 |
| 2012/0249532 A1 | 10/2012 | Kawada | |
| 2013/0002820 A1 | 1/2013 | Francisco | |
| 2013/0249895 A1 | 9/2013 | Westerinen et al. | |
| 2014/0055578 A1 | 2/2014 | Wu et al. | |
| 2014/0096084 A1 | 4/2014 | Kwon et al. | |
| 2014/0306879 A1 | 10/2014 | Oka et al. | |
| 2016/0027215 A1* | 1/2016 | Burns | G02B 27/0172 345/419 |
| 2016/0260251 A1* | 9/2016 | Stafford | G06T 19/006 |
| 2016/0378294 A1* | 12/2016 | Wright | G06F 3/04815 715/851 |

FOREIGN PATENT DOCUMENTS

| | | |
|---|---|---|
| CN | 102075776 A | 5/2011 |
| CN | 102158721 A | 8/2011 |
| CN | 102710952 A | 10/2012 |
| CN | 101566875 B | 11/2012 |
| CN | 102842301 A | 12/2012 |
| CN | 104937929 A | 9/2015 |
| JP | 2012-53090 A | 3/2012 |
| JP | 2012-137581 A | 7/2012 |
| JP | 2014-45474 A | 3/2014 |
| JP | 2014-206638 A | 10/2014 |
| KR | 10-2012-0072714 A | 7/2012 |
| KR | 10-2013-0074431 A | 7/2013 |
| KR | 10-1287251 B1 | 7/2013 |
| KR | 10-2014-0042544 A | 4/2014 |
| KR | 10-2014-0107973 A | 9/2014 |
| WO | 2014/005605 A1 | 1/2014 |
| WO | 2014/148673 A1 | 9/2014 |

OTHER PUBLICATIONS

International Search Report, issued by International Searching Authority in corresponding International Application No. PCT/KR2016/011510, dated Feb. 1, 2017, (PCT/ISA/210).

Written Opinion, issued by International Searching Authority in corresponding International Application No. PCT/KR2016/011510, dated Feb. 1, 2017, (PCT/ISA/237).

Communication dated Nov. 1, 2018, issued by the State Intellectual Property Office of P.R. China in counterpart Chinese Application No. 201680031737.7.

Communication dated Aug. 1, 2019, issued by the Chinese Patent Office in counterpart European Application No. 1201680031737.7.

* cited by examiner

ELECTRONIC DEVICE AND METHOD FOR CONTROLLING SAME

TECHNICAL FIELD

The present invention pertains to an electronic device and a controlling method thereof and, more particularly, to an electronic device which provides a virtual reality (VR) service and a controlling method thereof.

BACKGROUND

In general, virtual reality (VR) technology is a technology that enables all senses (visual, auditory, olfactory, taste, and tactile) of the human body in a 3D virtual environment similar to the actual environment created through computer graphic (CG) and that ultimately aims to maximize the utilization of information by making a human immersed in the virtual space by reproducing the virtual space three-dimensionally to participants and causing the participants to be immersed in the virtual space.

In recent years, various electronic devices for providing VR contents as well as VR contents implemented with VR technology have been developed.

However, in order to provide such VR content, there is a disadvantage that it is necessary to provide a dedicated device specialized for VR content reproduction.

Therefore, there is a necessity to find a way for a user to experience VR contents with existing TVs and monitors.

DETAILED DESCRIPTION

Tasks to be Solved

It is an object of the present invention to provide an electronic device and a controlling method thereof for providing VR contents having a virtual field of view corresponding to a distance between a user and an electronic device.

Means for Solving Problems

An electronic device according to an exemplary embodiment includes a display configured to display a virtual reality (VR) content; a detection unit configured to detect a distance between the electronic device and at least one of a user and a terminal device held by the user; and a processor configured to determine a virtual field of view corresponding to the distance detected by the detection unit and control the display to display a screen including a VR content area corresponding to the virtual field of view.

The processor may, in response to the virtual field of view being a field of view based on a user and the detected distance being increased than a previously-sensed distance, increase the virtual field of view, and in response to the detected distance being decreased than a previously-detected distance, decrease the virtual field of view.

The processor may, in response to the virtual field of view being a field of view based on the electronic device and the detected distance being increased than a previously-sensed distance, decrease the virtual field of view, and in response to the detected distance being decreased than a previously-detected distance, increase the virtual field of view.

The processor may control the display to change the virtual field of view by a predetermined ratio corresponding to a changed distance according to a change in the detected distance and display a screen including a VR content area corresponding to the changed virtual field of view.

The processor may change the predetermined ratio and apply the same according to at least one of an event to input a user, an event to input a specific type content, and an event in which the sensed distance satisfies a predetermined threshold distance.

The processor may operate in a field of view change mode which changes the virtual field of view according to the sensed distance or a field of view fixing mode which maintains the virtual field of view regardless of the sensed distance.

The detection unit may be implemented as at least one of a camera, an RF sensor, an ultrasonic sensor, a laser sensor, and an infrared sensor.

The processor may extract and display a screen including a content area corresponding to the virtual field of view from the VR content in which a content is reflected in a virtual three-dimensional space.

The processor may, when a plurality of users are detected by the detection unit, determine a virtual field of view which corresponds to a distance with a predetermined user from among the plurality of users or an average distance of the plurality of users.

A controlling method of an electronic device according to an exemplary embodiment includes determining a virtual field of view corresponding to a distance sensed by the detection unit; and controlling the display to display a screen comprising a VR content area corresponding to the virtual field of view. In this case, an electronic device may include a display displaying a VR content and a detection unit which detects a distance between the electronic device and at least one of a user and a terminal device held by the user.

Herein, the controlling method may further include, in response to the virtual field of view being a field of view based on a user and the detected distance being increased than a previously-sensed distance, increasing the virtual field of view, and in response to the detected distance being decreased than a previously-detected distance, decreasing the virtual field of view.

The controlling method may further include, in response to the virtual field of view being a field of view based on the electronic device and the detected distance being increased than a previously-sensed distance, decreasing the virtual field of view, and in response to the detected distance being decreased than a previously-detected distance, increasing the virtual field of view.

The controlling method may further include controlling the display to change the virtual field of view by a predetermined ratio corresponding to a changed distance according to a change in the detected distance and display a screen including a VR content area corresponding to the changed virtual field of view.

The controlling method may further include changing the predetermined ratio and applying the same according to at least one of an event to input a user, an event to input a specific type content, and an event in which the sensed distance satisfies a predetermined threshold distance.

The controlling method may further include operating in a field of view change mode which changes the virtual field of view according to the sensed distance or a field of view fixing mode which maintains the virtual field of view regardless of the sensed distance.

The detection unit may be implemented as at least one of a camera, an RF sensor, an ultrasonic sensor, a laser sensor, and an infrared sensor.

The controlling method may further include extracting and displaying a screen including a content area corresponding to the virtual field of view from the VR content in which a content is reflected in a virtual three-dimensional space.

The controlling method further including, when a plurality of users are detected by the detection unit, determining a virtual field of view which corresponds to a distance with a predetermined user from among the plurality of users or an average distance of the plurality of users.

Effect of Invention

As described above, according to various exemplary embodiments of the present invention, VR content having a virtual field of view corresponding to the distance between a user and an electronic device can be provided to provide a user with an optimal feeling of immersion.

PREFERRED EMBODIMENTS

Hereinbelow, an exemplary embodiment will be described in greater detail with reference to the drawings.

Figure 1A:
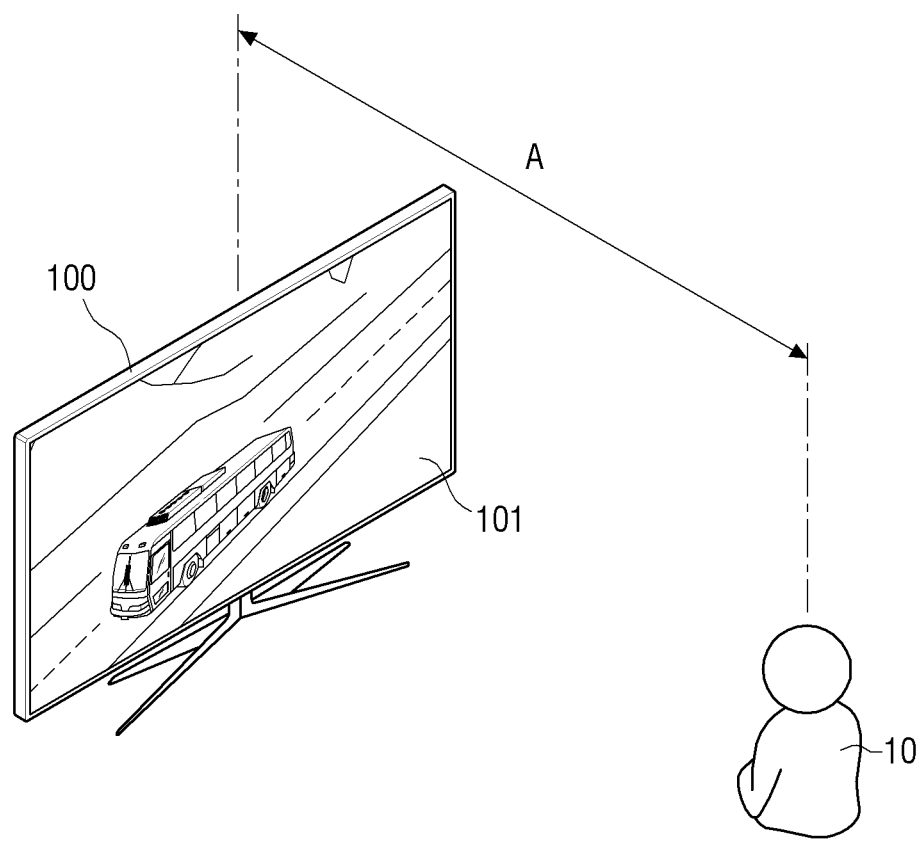
FIGS. 1A and 1B are views illustrating an example of an electronic device according to an exemplary embodiment.
Figure 1B:
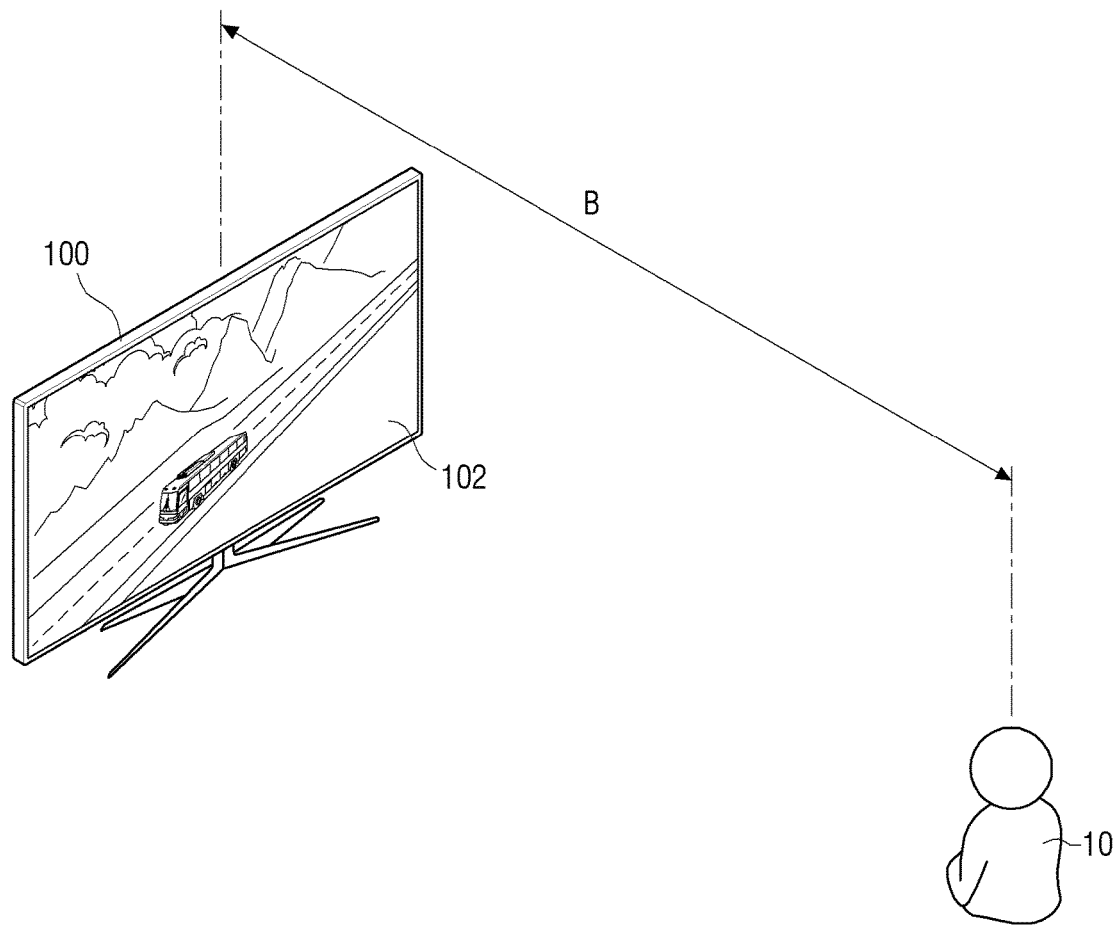

FIGS. 1A and 1B are views illustrating an example of an electronic device 100 according to an exemplary embodiment.

According to FIGS. 1A and 1B, a VR device, that is, an electronic device 100 according to an exemplary embodiment may be implemented as a general display device 100.

Specifically, the display device 100 may determine a virtual field of view by measuring the distance between the display device 100 and a user 10 by various distance measuring methods. Herein, the field of view refers to a range in which eye sight of a person reaches, and a virtual field of view refers to a predetermined field of view corresponding to the distance between the electronic device 100 and the user 10 in order to provide a sense of space to the user 10. Since the maximum field of view of a person corresponds to 100 to 120 degrees, the maximum range of the virtual field of view can also be set to 100 to 120 degrees.

For example, as shown in FIG. 1A, when the distance between the display device 100 and the user 10 is A, the display device 100 may display the VR contents of the first virtual field of view corresponding to the distance A. In the meantime, as shown in FIG. 1B, when the distance between the display device 100 and the user 10 is from A to B (B>A), the display device 100 may display a VR content in a second virtual field of view having a greater value than the first virtual field of view.

Here, the VR may include augmented reality in which information is displayed in three dimensions overlaid on a screen or the like.

In addition, the electronic device 100 can operate in combination with a device such as a remote control, a game console, and a 3D glasses. In this case, the electronic device 100 may be in various forms such as a TV, a monitor, a mobile phone, a PDA, an electronic dictionary, an MP3, a PMP, a tablet PC, and the like.

Meanwhile, the electronic device 100 can detect the distance between the electronic device 100 and the user 10, change the virtual field of view based on the detected distance, and display the changed field of view by applying the changed field of view to the VR content. The present invention will be described in detail with reference to the drawings.

Figure 2:
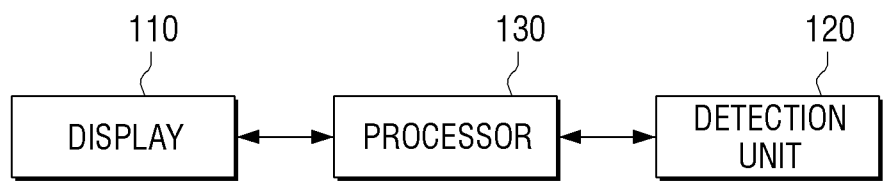
FIG. 2 is a block diagram to illustrate a configuration of an electronic device according to an exemplary embodiment.

FIG. 2 is a block diagram to illustrate a configuration of an electronic device 100 according to an exemplary embodiment.

According to FIG. 2, the electronic device 100 according to an exemplary embodiment of the present invention includes a display 100, a detection unit 120, and a processor 130. Here, the electronic device 100 may receive VR content from the outside, or may generate VR content based on data input from the outside.

The display 110 displays VR content. Here, the VR content may be a general two-dimensional image, but is not limited thereto, and may be a 3D image including a left-eye and right-eye image for providing a VR service, or a panorama VR content.

The display 100 can also display VR contents to which a virtual field of view corresponding to the distance between the electronic device 100 and the user 10 is applied, under the control of the processor 130.

The detection unit 120 may detect the distance between the electronic device 100 and at least one of the user 10 and the terminal device the user 10 holds.

Specifically, the detection unit 120 may detect the distance between the electronic device 100 and the user 10. Here, the reference points for detecting the distance between the electronic device 100 and the user 10 may vary. For example, the reference point may be the display 100, a bezel (not shown), a pedestal (not shown), the detection unit 120, etc., which are part of the electronic device 100. In case of the user 10, all the body parts of the user 10 or the entire body may be the reference point. The detection unit 120 may transmit distance information to the processor 130 that detects the reference point. Here, when there are a plurality of users 10, the detection unit 120 may transmit detection information about a part of users or all users among the distance information detected from a plurality of users to the processor 130.

The detection unit 120 may detect the distance between the electronic device 100 and the terminal device held by the user 10.

Here, the terminal device provided by the user 10 may be a variety of terminal devices such as a remote controller for controlling a display device, a joystick for operating a game, and a mobile phone. The detection unit 120 may indirectly detect the user 10 by sensing a terminal device provided by the user 10.

Meanwhile, the detection unit 120 may be implemented by at least one of a camera, an RF sensor, an ultrasonic sensor, a laser sensor, and an infrared sensor.

The camera can photograph at least one of the user 10 and the terminal devices provided by the user 10. The processor 130, which will be described later, may perform a camera calibration to determine intrinsic parameters, extrinsic parameters between the camera coordinate system and the camera coordinate system. After this process, the processor 130 may extract the terminal device of the user 10 or the user 10 from a plurality of images and measure the distance. Here, the camera 130 may be two or more cameras. At this time, the processor 130 may simultaneously acquire images from two or more cameras and measure distances by matching between images. In the meantime, the camera may be provided at a portion of the electronic device 100 or at a location spaced from the electronic device 100 via an extension.

The RF sensor measures distance using radio frequency (RF). The RF sensor emits an electromagnetic wave (usually 1 MHz or more) corresponding to a microwave to a terminal device of the user 10 or the user 10. It is possible to receive the microwave reflected back from the terminal device of the user 10 or the user 10 and to measure the time when the microwave is reflected and returned to the RF sensor.

Ultrasonic sensors use ultrasonic waves to measure distances. Here, ultrasound (ultrasonic) means a sound which cannot be heard by the human ear and is more than 20 Khz sound. The ultrasonic sensor generates ultrasonic waves by using a piezoelectric element (a device that generates voltage when applied with mechanical pressure, and mechanical change is generated when voltage is applied). The ultrasonic sensor can measure the time when the ultrasonic waves are reflected from the terminal device of the user 10 or the user 10.

The laser sensor measures the distance using a laser. The laser sensor emits and detects the laser using the laser transmitter and the laser receiver. The laser sensor emits a laser pulse signal to measure the time at which the reflection pulse signals from the user 10 or the user 10 within the measurement range arrive at the laser receiver. Alternatively, the laser sensor emits a continuously modulated laser beam with a specific frequency and measures the amount of phase variation of the signal reflected back from the user 10 or user terminal 10 within the measurement range.

Infrared sensors measure distances using infrared (wavelengths above 900 nm). The infrared sensor may emit an infrared signal and measure the amount of infrared light reflected by the user 10 or the terminal 10 provided by the user 10. Here, the infrared sensor can measure the distance by using a correlation in which the reflection amount of infrared rays is inversely proportional to the distance square.

The distance measurement method described above may be measured using a variety of known sensing techniques as well as a camera, an RF sensor, an ultrasonic sensor, a laser sensor, and an infrared sensor.

In the above description, the distance is measured by a camera, an RF sensor, an ultrasonic sensor, a laser sensor, and an infrared sensor itself. However, in the camera, the RF sensor, the ultrasonic sensor, the laser sensor, and the infrared sensor, it is also possible that the collected data is processed by the processor 130 and the distance is measured.

In the above description, it is assumed that the user 10 is a single user. However, in the case where a plurality of users are detected by the processor 130, a virtual field of view corresponding to a distance from the user or an average distance of a plurality of users can be determined. In one example, the predetermined user may be set as the closest person or the largest person among a plurality of users, and the average distance of the plurality of users may be an average of a distance of some of the plurality of users.

Meanwhile, the detection unit 120 may sense the up, down, left, and right movements of the terminal of the user 10. For this, the detection unit 120 may further include a sensor, such as a RADAR, having a function of identifying a position of the user 10 in accordance with the up, down, left, and right movement of the terminal. Here, the processor 130 may move the VR contents area up, down, left, and right according to the vertical, horizontal, and left positions of the terminal of the user 10 detected by the detection unit 120. The processor 130 controls the overall operation of electronic device 100. In particular, the processor 130 may determine a virtual field of view corresponding to the distance sensed by the detection unit 120.

Specifically, the processor 130 may use a table in which a virtual field of view matching the sensed distance is recorded.

In one example, the processor 130 may receive the distances between the electronic device 100 and the user 10 received via the detection unit 120. At this time, when the received distance is 2 m, the processor 130 can determine a virtual field of view corresponding to the distance 2 m to 90 degrees with reference to the table.

Here, in the table, the type matched to the sensed distance is described as a virtual field of view, but the type matched to the sensed distance may be the coordinate value in the VR space.

On the other hand, when the field of view corresponding to the detected distance is determined, the processor 130 can control the display 110 to display a screen including the VR contents area corresponding to the virtual field of view.

Specifically, the processor 130 may control to extract and display a screen including a content area corresponding to a virtual field of view in the VR content in which content is projected in a virtual three-dimensional space.

To this end, the processor 130 may update the coordinates of the content area corresponding to the updated virtual field of view. For example, the processor 130 may increase or decrease the coordinate value matching the content area according to the variation ratio of the virtual field of view. In this case, the coordinate value may be in pixel units.

Meanwhile, when the distance between the terminal devices of the user 10 and the user 10 is changed, the processor 130 can change the virtual field of view as well.

Specifically, the processor 130 changes the virtual field of view by a predetermined ratio corresponding to the changed distance as the sensed distance is changed, and displays the screen including the VR contents area corresponding to the changed virtual field of view 110.

Here, the processor 130 changes a predetermined ratio and applies the changed ratio according to at least one of an event that a user 10 command is input, an event that a specific type of content is input, and an event of which sensed distance satisfies a predetermined threshold distance. The predetermined ratio is a ratio for increasing or decreasing the virtual field of view in accordance with the increase or decrease of the sensed distance.

The processor 130 may change the preset ratio according to an event in which the command of the user 10 is input. This will be described with reference to FIG. 3.

Figure 3:
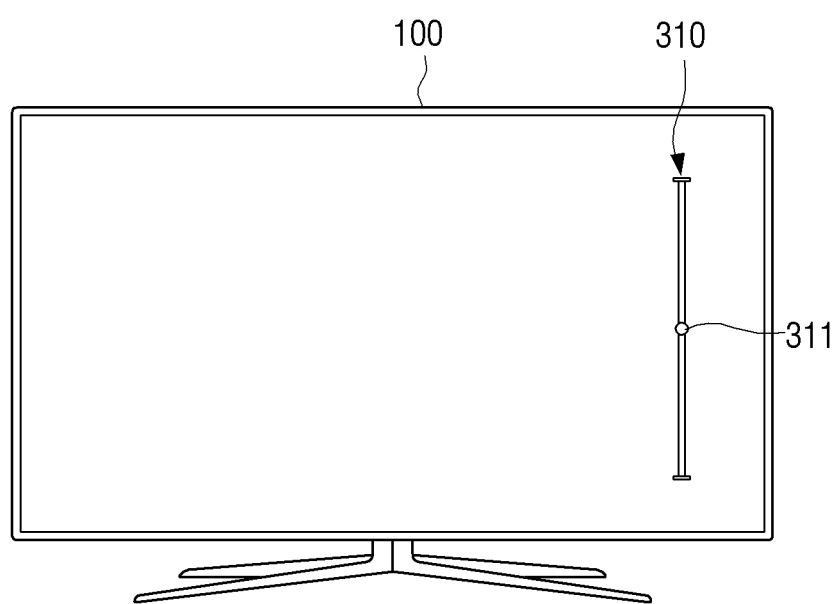
FIG. 3 is a drawing which illustrates a GUI for changing a preset ratio according to an exemplary embodiment.

FIG. 3 is a drawing which illustrates a GUI for changing a preset ratio according to an exemplary embodiment.

Referring to FIG. 3, for example, the processor 130 outputs a Graphic User Interface (GUI) for adjusting a predetermined ratio on the display 110. The GUI 310 for adjusting the predetermined ratio includes an adjustment GUI 311 that can be moved upward and downward by the operation of the user 10. Here, when the adjustment GUI 311 is moved upward in the previous position, a predetermined ratio is increased, and when the adjustment GUI 311 is moved downward from the previous position, a predetermined ratio is decreased. As the preset ratio increases, the ratio of the virtual field of view increases or decreases as the sensed distance increases. Further, when the predetermined ratio is decreased, the ratio of the virtual field of view that is increased or decreased increases as the sensed distance decreases.

The above-described GUI is only an example, and the GUI may be implemented in various examples in order to receive an input for adjusting a predetermined ratio from the user.

In addition, the processor 130 may change a preset ratio according to an event that a specific type of content is input.

For example, when a particular type of content is a shooting game, since the user 10 needs to enlarge the target point relatively large in order to aim the target, the processor 130 may set the predetermined ratio to a larger value so that it is possible to increase the ratio of change of the size of the virtual field of view corresponding to the change of the distance between the electronic device 100 and the user or the electronic device 100 and the terminal device of the user.

Alternatively, if the particular type of content is a romance movie, it may not be necessary to change the virtual field of view due to the distance change. At this time, the processor 130 may set a predetermined ratio to a smaller value so that the change ratio of the size of the virtual field of view corresponding to the change in the distance between the electronic device 100 and the user or the terminal device of the user 10 can be reduced.

In addition, the processor 130 may change the predetermined ratio according to an event that the sensed distance satisfies a predetermined threshold distance.

Specifically, the virtual field of view cannot be made infinitely large or infinitely small as the user 10 or the terminal device provided by the user 10 gets distant from or closer to the electronic device 100. Accordingly, the processor 130 may reduce a predetermined ratio of changing the virtual field of view corresponding to the change in the sensed distance when the sensed distance is out of the predetermined threshold distance. Here, the processor 130 may stop the increase or decrease of the virtual field of view when the predetermined sensing distance satisfies the predetermined threshold distance.

Meanwhile, the processor 130 may increase or decrease, decrease or increase the virtual field of view depending on the increase or decrease of the sensed distance. This will be described in detail with reference to FIGS. 4A and 4B.

Figure 4A:
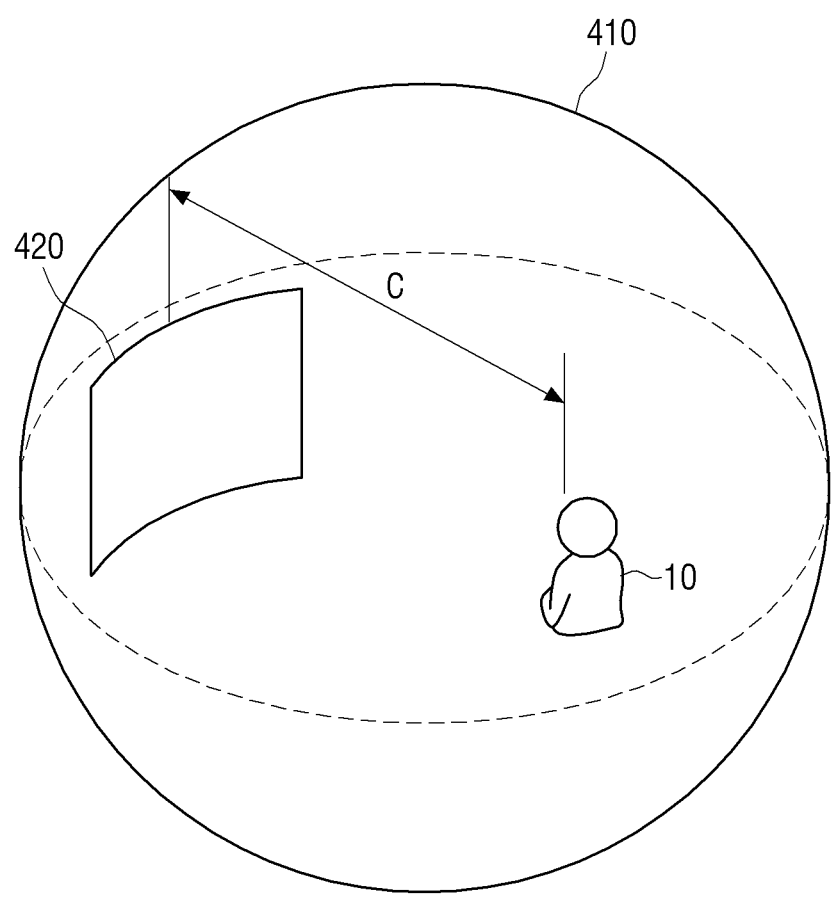
FIGS. 4A and 4B are views to describe changing a field of view based on a user according to an exemplary embodiment.
Figure 4B:
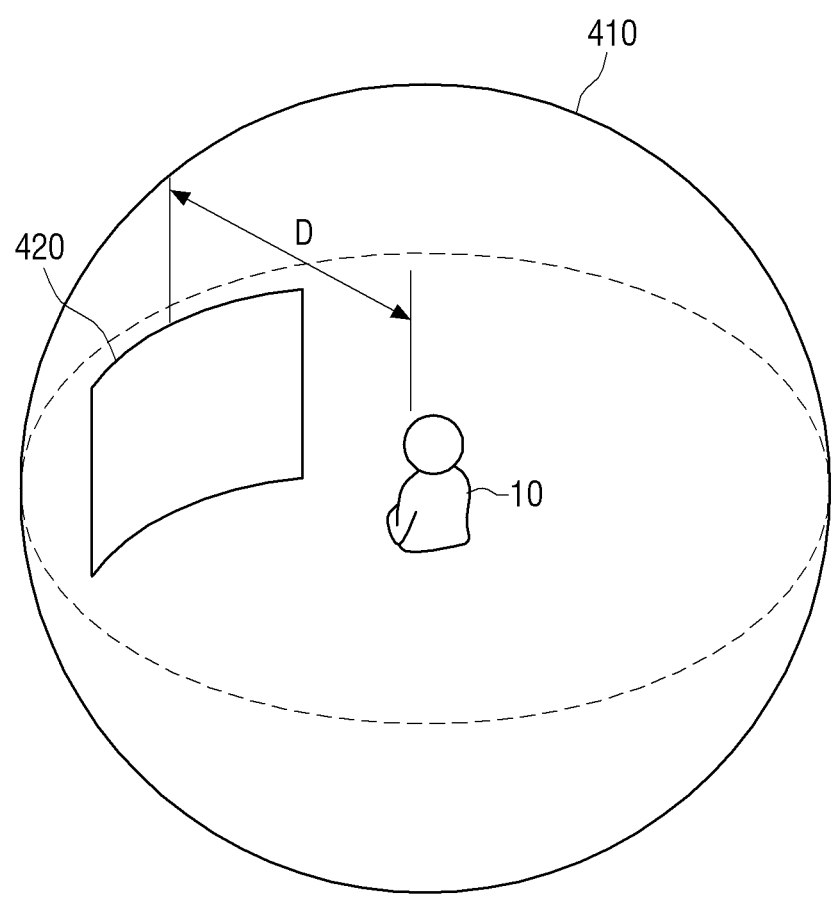

FIGS. 4A and 4B are views to describe changing a field of view based on a user according to an exemplary embodiment.

FIGS. 4A and 4B show a change in the field of view based on the user 10. Referring to FIG. 4A, the VR contents include images of all areas on a three-dimensional space. Thus, viewing an area of the VR content through the display 110 of the electronic device 100 may be assumed as if the user 10 views an area 420 of the sphere 410 within the sphere 410.

Here, assuming that one area 420 of the sphere 410 is one wall, if the user 10 is located at the distance C and moves to the position of the distance D (C>D), the user 10 moves closer to the wall. As such, when the wall is close to the user 10, the field of view of the user 10 decreases.

As a result, if the virtual field of view is a field of view based on the user 10, the processor 130 increases the virtual field of view when the sensed distance is greater than the previously sensed distance, and if the sensed distance decreases than the previously sensed distance, a virtual field of view can be reduced.

Figure 5A:
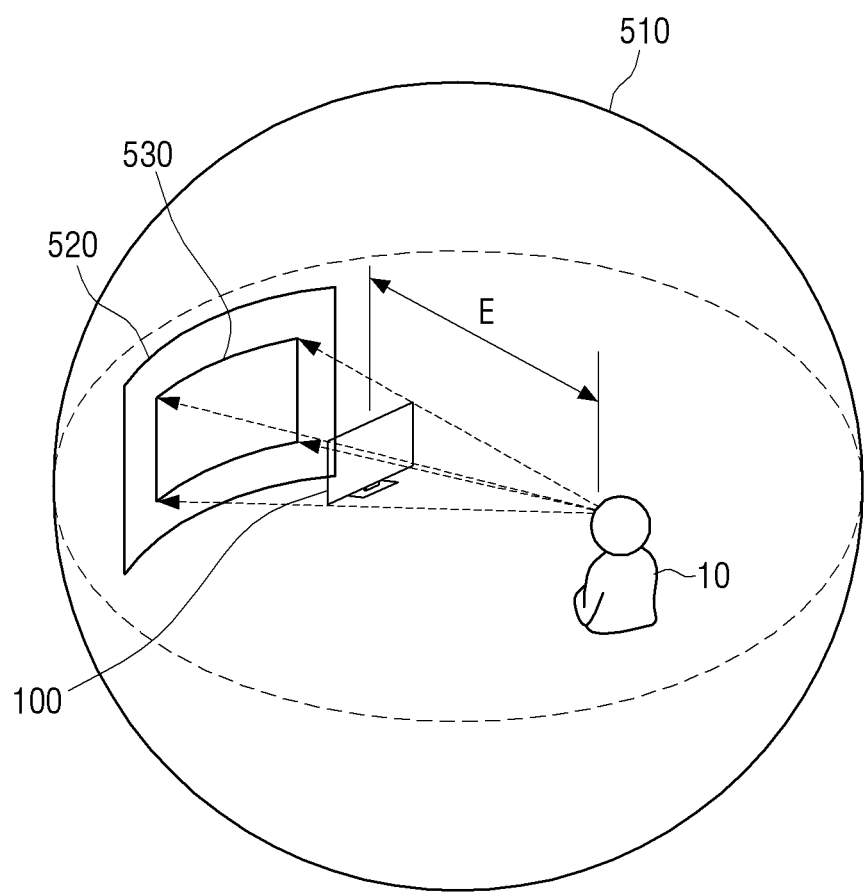
FIGS. 5A and 5B are views to describe changing a field of view based on a display device according to an exemplary embodiment.
Figure 5B:
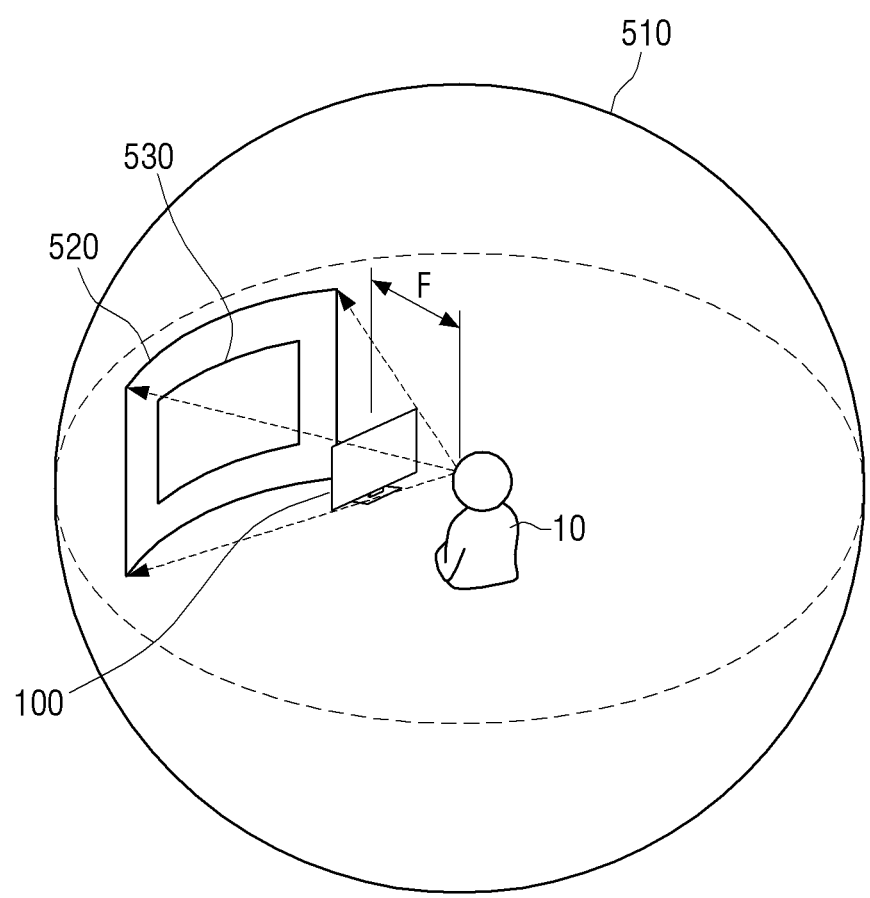

FIGS. 5A and 5B are views to describe changing a field of view based on a display device according to an exemplary embodiment.

FIGS. 5A and 5B show the field of view changes based on the electronic device 100. Referring to FIG. 5A, assuming that the electronic device 100 is a window, the user 10 may be located at a distance of F from the electronic device 100 and views an area 530 of the sphere 510, through a window, that is, the electronic device 100. In FIG. 5, the user 10 is located in an area which is distant front the electronic device 100 by a distance F. That is, the user 10 has moved closer to the electronic device 100 than in FIG. 5A (E>F). Here, the user 10 looks at one area 520 of the sphere 510 through the window, that is, the electronic device 100. As such, when the user 10 becomes closer to the electronic device 100, the field of view of the user 10 increases.

As such, the processor 130 may reduce the virtual field of view if the virtual field of view is a field of view of the electronic device reference, and if the sensed distance is greater than the previously sensed distance, it is also possible to increase the virtual field of view.

Figure 6:
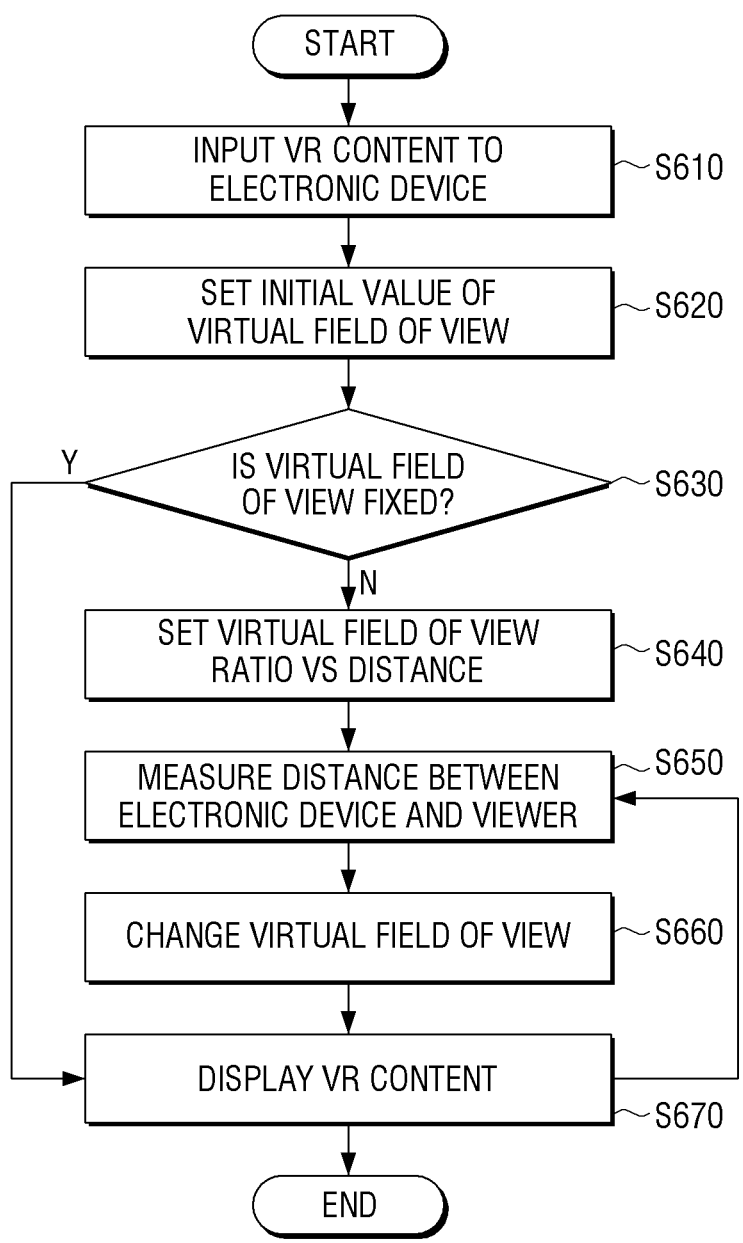
FIG. 6 is a flowchart to describe a process of changing a field of view according to a sensed distance according to an exemplary embodiment.

FIG. 6 is a flowchart to describe a process of changing a field of view according to a sensed distance according to an exemplary embodiment.

Referring to FIG. 6, VR content may be input to the electronic device 100 (S610). As described above, the processor 130 is also capable of receiving VR content from the outside and generating VR contents.

When the VR contents are input, the processor 130 sets an initial value for the virtual field of view (S620). Here, the initial value may be a virtual field of view corresponding to the type of the VR content or a field of view corresponding to the distance of the user at the time of setting the initial value.

When the initial value is set, the processor 130 determines whether to fix the virtual field of view (S630). Here, the processor 130 may determine whether to fix the field of view according to the type of the VR content, or may determine whether to fix the field of view by receiving the input of the user 10. For example, the processor 130 may operate in a field-of-view changing mode that changes the virtual field of view depending on the sensed distance, or a field-of-view fixed mode that maintains the virtual field of view regardless of the sensed distance.

If the virtual field of view is determined to be fixed (Y), the processor 130 controls the display 110 to display the VR content. If it is determined that the virtual field of view is not fixed (N), the ration that the virtual field of view is changed in response to the change in the sensed distance may be set (S640). Here, the processor may determine the ratio according to the type of the VR content, or may receive the input from the user 10 and determine the ratio.

When a ratio of changing the virtual field of view is set in response to the change in the sensed distance, the processor 130 uses the detection unit 120 to measure the distance between the electronic device 100 and the user or between the terminal devices owned by the user (S650).

In addition, the processor 130 may change the virtual field of view based on the sensed distance (S660). Thereafter, the processor 130 may control the display 110 to display the VR content area to which the changed virtual field of view is applied (S670). The processor 130 may update the virtual field of view by sensing the distance between the electronic device 100 and the user or the distance between the terminal device of the user at predetermined tune intervals.

Figure 7:
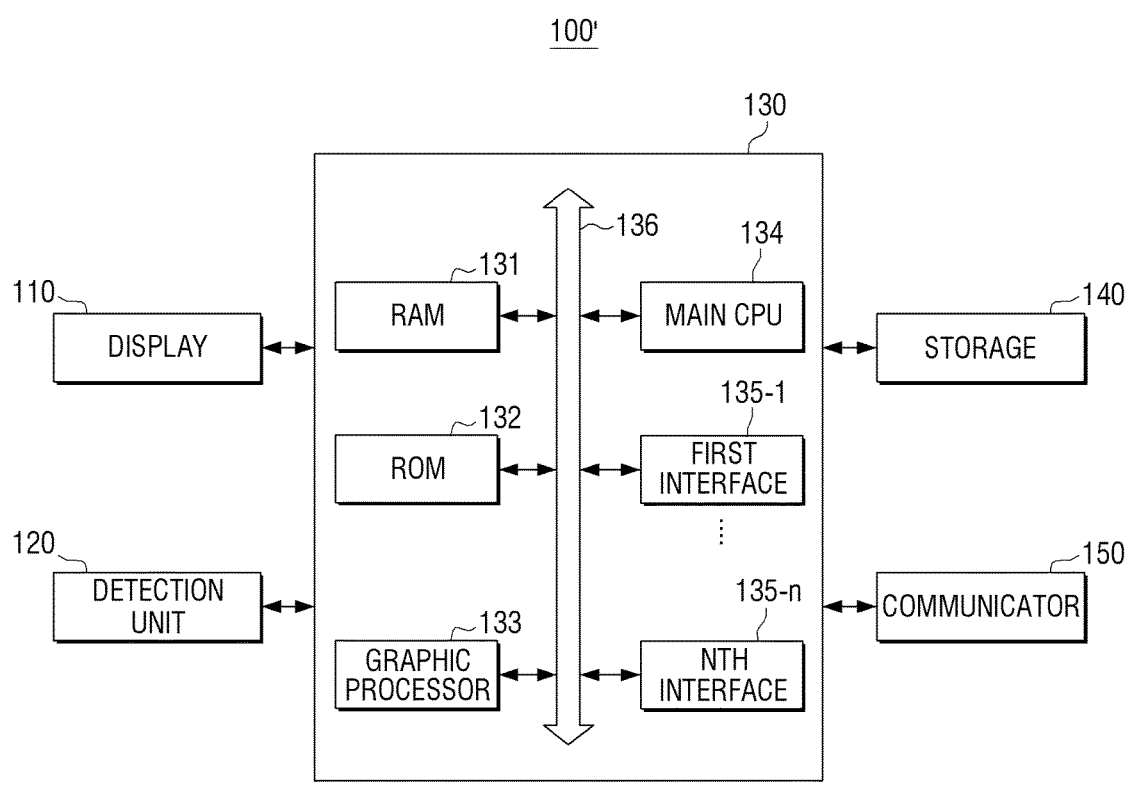
FIG. 7 is a block diagram which illustrates a detailed configuration of an electronic device according to another exemplary embodiment.

FIG. 7 is a block diagram which illustrates a detailed configuration of an electronic device 100' according to another exemplary embodiment.

Referring to FIG. 7, an electronic device 100' includes a display 110, a detection unit 120, a controller 130, a storage 140, and a communicator 150. The parts of a detailed description of FIG. 7 overlapping with those shown in FIG. 2 in the configuration shown in FIG. 7 will be omitted.

The display 110 displays VR content. In this case, the display 110 may be implemented as an Liquid Crystal Display (LCD Panel), an Organic Light Emitting Diodes (OLED), or the like, but is not limited thereto. In addition, the display 110 may be implemented as a flexible display, a transparent display, or the like as the case may be. When the smartphone is connected and used as a monitor, the display 110 can be implemented as a display of a smartphone.

The detection unit 120 may sense the user 10 or the terminal device of the user 10. The detection unit 120 may be connected to a line extending from the electronic device 100'.

An operation of the processor 130 may be implemented by a stored program.

To be specific, the processor 130 includes RAM 131, ROM 132, main CPU 133, graphic processor 134, first to $n^{th}$ interface 135-1~135-n, and bus 136.

The RAM 131, ROM 132, main CPU 133, graphic processor 134, first to $n^{th}$ interface 135-1~135-n may be interconnected through the bus 136.

The first to $n^{th}$ interfaces 135-1 to 135-n are connected to the various components described above. One of the interfaces may be a network interface connected to an external device via a network.

The main CPU 133 accesses the storage 140 and performs booting using the O/S stored in the storage 140. Then, various operations are performed using various programs, contents, data, and the like stored in the storage 140. For example, the main CPU 133 may use the table stored in the storage 140 to determine a virtual field of view corresponding to the sensed distance.

The ROM 132 stores a command set for booting the system arid the like. When the turn-on command is input and power is supplied, the main CPU 133 copies the O/S stored in the storage 140 to the RAM 131 according to the command stored in the ROM 132 and executes O/S to boot the system. When the booting is completed, the main CPU 133 copies various application programs stored in the storage 140 to the RAM 131, executes the application program copied to the RAM 131, and performs various operations.

The graphic processor 134 generates a screen including various objects such as an icon, an image, and a text using an operation unit (not shown) and a rendering unit (not shown). An operation unit (not shown) calculates an attribute value such as a coordinate value, a shape, a size, and a color with which each object is displayed according to the layout of the screen based on the received control command. The rendering unit (not shown) generates screens of various layouts including the objects based on the attribute values calculated by the operation unit (not shown).

The storage 140 may store various data such as an O/S software module for driving the electronic device 100' and various multimedia contents.

In particular, the storage 150 may store information of virtual field of view corresponding to the sensed distance according to an exemplary embodiment.

In addition, the storage 140 may store data for generating a control signal corresponding to a user command input through various UI screens.

The communicator 150 performs communication with an external device. The communicator 150 may communicate with an external device through various communication methods such as BlueTooth (BT), Wireless Fidelity (WI-FI), Zigbee, IR, Serial Interface, Universal Serial Bus. In particular, the communicator 150 may receive VR contents data front an external device.

The communicator 150 may receive position information from a terminal held by the user 10.

Specifically, the terminal held by the user 10 may include, for example, a gyro sensor. The terminal of the user 10 can transmit location information corresponding to the top, bottom, left, and right of the terminal of the user 10 sensed by the gyro sensor to the electronic device 100'. At this time, the processor 130 can move and display the area of the VR contents based on the location information of the terminal of the user 10. For example, when the position of the terminal of the user 10 is shifted to the left, the processor 130 can move and display the area of the VR contents to the left.

The communicator 150 may receive a signal corresponding to an input of a upper, lower, right, and left movement button of a terminal provided by the user 10 front a terminal provided by the user 10. For example, when the processor 130 receives a signal corresponding to an input of the left movement button of the terminal of the user 10, the processor 130 may move the area of the VR contents to the left and display the same. As such, the electronic device 100' may display the entire upper, lower, right, and left areas of the VR contents according to the input of the user 10, thereby faithfully providing the user 10 with the experience of the VR contents.

Figure 8:
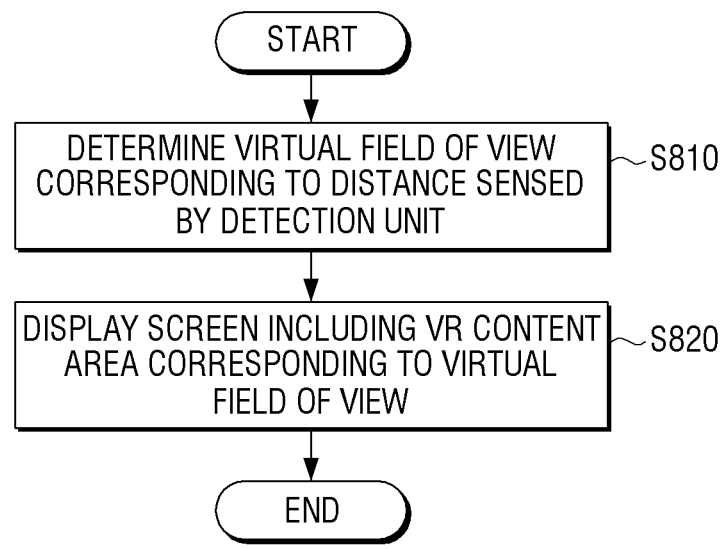
FIG. 8 is a flowchart to describe a controlling method of an electronic device according to an exemplary embodiment.

FIG. 8 is a flowchart to describe a controlling method of an electronic device according to an exemplary embodiment.

According to the method of controlling an electronic device according to an embodiment of the present invention shown in FIG. 8, a virtual field of view corresponding to a distance sensed by the detection unit is determined (S810), and the display may be controlled to display a screen including the corresponding VR content area (S820). In this case, the electronic device may be implemented as a display for displaying Virtual Reality (VR) contents, and a detection unit for sensing a distance between the user and at least one of the terminal devices provided by the user and the electronic device.

The controlling method may further include increasing the virtual field of view when the virtual field of view is a field of view based on a user and when the detected distance is greater than the previously sensed distance, and if the sensed distance is smaller than the previously sensed distance, decreasing the virtual field of view The controlling method may further include, in response to the virtual field of view being a field of view based on a user and the detected distance being increased than a previously-sensed distance, increasing the virtual field of view, and in response to the detected distance being decreased than a previously-detected distance, decreasing the virtual field of view.

The controlling method may further include controlling the display to change the virtual field of view by a predetermined ratio corresponding to a changed distance according to a change in the detected distance and display a screen including a VR content area corresponding to the changed virtual field of view.

The controlling method may further include changing the predetermined ratio and applying the same according to at least one of an event to input a user, an event to input a specific type content, and an event in which the sensed distance satisfies a predetermined threshold distance.

The controlling method may further include operating in a field of view change mode which changes the virtual field of view according to the sensed distance or a field of view fixing mode which maintains the virtual field of view regardless of the sensed distance.

The detection unit may be implemented as at least one of a camera, an RF sensor, an ultrasonic sensor, a laser sensor, and an infrared sensor.

The controlling method may further include extracting and displaying a screen including a content area corresponding to the virtual field of view from the VR content in which a content is reflected in a virtual three-dimensional space.

The controlling method further including, when a plurality of users are detected by the detection unit, determining a virtual field of view which corresponds to a distance with a predetermined user from among the plurality of users or an average distance of the plurality of users.

Meanwhile, the methods according to various embodiments may be programmed and stored in various storage media. Accordingly, the methods according to various embodiments described above can be implemented in various types of electronic devices that execute the storage medium.

More specifically, according to an embodiment of the present invention, a non-transitory computer readable medium in which a program to sequentially performs the step of determining a virtual field of view corresponding to a distance sensed by the detection unit and controlling a display to display a screen including VR content area corresponding to the virtual field of view is stored can be provided.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided therein.

The foregoing exemplary embodiments and advantages are merely exemplary and are not to be construed as limiting the inventive concept. The exemplary embodiments may be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. An electronic device, comprising:
   a display configured to display a virtual reality (VR) content;
   a detection unit configured to detect a distance between the electronic device and either one or both of a user and a terminal device being held by the user; and
   a processor configured to:
     identify a virtual field of view by increasing the virtual field of view based on the detected distance being increased from a previously-detected distance and decreasing the virtual field of view based on the detected distance being decreased from the previously-detected distance;
     identify a virtual reality (VR) content area corresponding to the virtual field of view in a VR content; and
     control the display to display a screen including the VR content area,
     wherein the virtual field of view is a field of view based on the user.

2. The electronic device of claim 1, wherein the processor is further configured to control the display to change the virtual field of view by a predetermined ratio corresponding to a change in the detected distance.

3. The electronic device of claim 2, wherein the processor is further configured to change the predetermined ratio, based on any one or any combination of an event to input the user, an event to input a specific type content, and an event in which the detected distance satisfies a predetermined threshold distance.

4. The electronic device of claim 1, wherein the processor is further configured to operate in a field of view change mode in which the virtual field of view is changed based on the detected distance, or a field of view fixing mode in which the virtual field of view is maintained regardless of the detected distance.

5. The electronic device of claim 1, wherein the detection unit is implemented as any one or any combination of a camera, an RF sensor, an ultrasonic sensor, a laser sensor, and an infrared sensor.

6. The electronic device of claim 1, wherein the processor is further configured to extract and display another screen comprising another content area corresponding to the virtual field of view, from the VR content in which a content is reflected in a virtual three-dimensional space.

7. The electronic device of claim 1, wherein the processor is further configured to, based on a plurality of users being detected by the detection unit, determine the virtual field of view corresponding to another distance with a predetermined user among the plurality of users or to an average distance of the plurality of users.

8. An electronic device, comprising:
   a display;
   a detection unit configured to detect a distance between the electronic device and either one or both of a user and a terminal device being held by the user; and
   a processor configured to:
     identify a virtual field of view by increasing the virtual field of view based on the detected distance being increased from a previously-detected distance and decreasing the virtual field of view based on the detected distance being increased from the previously-detected distance;
     identify a virtual reality (VR) content area corresponding to the virtual field of view in a VR content; and
     control the display to display a screen including the VR content area corresponding to the virtual field of view,
     wherein the virtual field of view is a field of view based on the electronic device.

9. A controlling method of an electronic device that comprises a display and a detection unit detecting a distance between the electronic device and either one or both of a user and a terminal device being held by the user, the method comprising:
   identifying a virtual field of view, by increasing the virtual field of view based on the detected distance being increased from a previously-detected distance and decreasing the virtual field of view based on the detected distance being decreased from the previously-detected distance;

identifying a virtual reality (VR) content area corresponding to the virtual field of view in a VR content; and controlling the display to display a screen comprising the VR content area, wherein the virtual field of view is a field of view based on the user.

10. The controlling method of claim 9, further comprising:

based on the virtual field of view being another field of view based on the electronic device and the detected distance being increased from the previously-detected distance, decreasing the virtual field of view; and based on the virtual field of view being the other field of view based on the electronic device and the detected distance being decreased from the previously-detected distance, increasing the virtual field of view.

11. The controlling method of claim 9, further comprising controlling the display to change the virtual field of view by a predetermined ratio corresponding to a change in the detected distance.

12. The controlling method of claim 11, further comprising changing the predetermined ratio, based on any one or any combination of an event to input the user, an event to input a specific type content, and an event in which the detected distance satisfies a predetermined threshold distance.

13. The controlling method of claim 9, further comprising operating in a field of view change mode in which the virtual field of view is changed based on the detected distance, or a field of view fixing mode in which the virtual field of view is maintained regardless of the detected distance.

* * * * *